United States Patent
Bailey (10) Patent No.: US 10,934,866 B2
(45) Date of Patent: Mar. 2, 2021

(54) VARIABLE PITCH CHANGE CONTROL METHOD

(71) Applicant: Rolls-Royce North American Technologies Inc., Indianapolis, IN (US)

(72) Inventor: Patrick Bailey, Lebanon, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 267 days.

(21) Appl. No.: 15/962,550

(22) Filed: Apr. 25, 2018

(65) Prior Publication Data

US 2018/0363481 A1 Dec. 20, 2018

Related U.S. Application Data

(60) Provisional application No. 62/522,329, filed on Jun. 20, 2017.

(51) Int. Cl.
| | |
|---|---|
| *F01D 7/00* | (2006.01) |
| *F04D 29/36* | (2006.01) |
| *F02K 3/06* | (2006.01) |
| *F04D 29/32* | (2006.01) |
| *B64C 11/32* | (2006.01) |

(52) U.S. Cl.
CPC ............... *F01D 7/00* (2013.01); *B64C 11/32* (2013.01); *F02K 3/06* (2013.01); *F04D 29/323* (2013.01); *F04D 29/325* (2013.01); *F04D 29/362* (2013.01); *F05D 2220/36* (2013.01); *F05D 2260/532* (2013.01); *F05D 2260/56* (2013.01); *F05D 2260/74* (2013.01); *F05D 2260/77* (2013.01); *F05D 2260/79* (2013.01); *F05D 2270/021* (2013.01)

(58) Field of Classification Search
CPC .................................... F01D 7/00; B64C 11/32
See application file for complete search history.

(56) References Cited

U.S. PATENT DOCUMENTS

| | | | | |
|---|---|---|---|---|
| 1,482,690 | A | * | 2/1924 | Lanzius ................ B64C 11/343 416/51 |
| 2,086,686 | A | * | 7/1937 | Weible .................. F03D 7/0224 416/51 |
| 2,844,303 | A | | 7/1958 | Kristiansen |
| 3,085,631 | A | | 4/1963 | Dagrell |
| 3,907,460 | A | | 9/1975 | Pedersen et al. |
| 3,920,353 | A | | 11/1975 | Bredsted |
| 3,922,852 | A | | 12/1975 | Drabek |
| 3,994,128 | A | | 11/1976 | Griswold, Jr. et al. |
| 4,021,142 | A | | 5/1977 | Violette |
| 4,573,874 | A | | 3/1986 | Anderson et al. |
| 4,630,999 | A | | 12/1986 | De La Harpe |

(Continued)

*Primary Examiner* — Igor Kershteyn
*Assistant Examiner* — Juan G Flores
(74) *Attorney, Agent, or Firm* — Barnes & Thornburg LLP (57) ABSTRACT

A gas turbine engine includes a fan having a plurality of fan blades configured to rotate about a central axis of the gas turbine engine. Each fan blade is configured to pivot about a pivot axis that extends radially away from the central axis to vary a pitch of the fan blade. The fan further includes a counterforce system configured to resist forces that urge the fan blades away from their pitch positions during operation of the gas turbine engine.

20 Claims, 7 Drawing Sheets

(56) References Cited

U.S. PATENT DOCUMENTS

| | | | | |
|---|---|---|---|---|
| 4,913,623 | A | * | 4/1990 | Schilling ............... B64C 11/346 416/129 |
| 7,682,128 | B2 | | 3/2010 | Kinzer |
| 8,075,270 | B2 | | 12/2011 | Violette et al. |
| 9,085,979 | B2 | * | 7/2015 | Balk .................... B64C 11/306 |
| 2016/0032740 | A1 | | 2/2016 | Niergarth et al. |
| 2017/0138207 | A1 | | 5/2017 | Niergarth et al. |

* cited by examiner

VARIABLE PITCH CHANGE CONTROL METHOD

CROSS REFERENCE TO RELATED APPLICATIONS

This application claims priority to and the benefit of U.S. Provisional Patent Application No. 62/522,329, filed 20 Jun. 2017, the disclosure of which is now expressly incorporated herein by reference.

STATEMENT REGARDING FEDERALLY SPONSORED RESEARCH OR DEVELOPMENT

Embodiments of the present disclosure were made with government support under Contract No. NNC14CA29C Phase III awarded by the National Aeronautics and Space Administration. The government may have certain rights.

FIELD OF THE DISCLOSURE

The present disclosure relates generally to gas turbine engines, and more specifically to fans used with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, a fan to generate thrust to propel the aircraft. Left-over products of the combustion are exhausted out of the turbine and may provide additional thrust in some applications.

Other gas turbine engines are configured to drive a propeller for generating thrust. In some propeller driven aircraft, the propeller blades are configured to pivot about their respective axis to vary a pitch of the propeller blades. The pitch of the blades may be controlled using actuators and/or counterweights coupled directly to the propeller blades. However, such control methods may be limited by design space and weight allocations when incorporated into fans used with gas turbine engines.

SUMMARY

The present disclosure may comprise one or more of the following features and combinations thereof.

A variable-pitch fan for use with a gas turbine engine may include a fan rotor, a pitch controller, and a counterforce system. The fan rotor may be mounted for rotation about a central axis of the variable-pitch fan to produce thrust. The fan rotor may include a fan disk and a plurality of fan blades that extend radially outward relative to the central axis away from the fan disk along corresponding radially extending fan-blade pivot axes. Each of the plurality of fan blades may be configured to rotate about the corresponding fan-blade pivot axis between a closed position and a reverse-thrust position to vary a pitch of the fan blades. Turning-moment forces may be applied to each of the plurality of fan blades which urge each of the plurality of fan blades toward the closed position during rotation of the fan rotor about the central axis.

The pitch controller may be configured to change the pitch of the fan blades. The pitch controller may be mounted to rotate about the central axis with the fan disk and may include a control gear connected to the plurality of fan blades. The control gear may be configured to selectively rotate partway about the central axis relative to the fan disk to cause the plurality of fan blades to rotate about the fan-blade pivot axes and vary the pitch of the plurality of fan blades. The fan blades may transmit the turning-moment forces to the control gear to urge the control gear to rotate about the central axis relative to the fan disk during rotation of the fan rotor about the central axis.

The counterforce system may be connected to the control gear. The counterforce system may be configured to counteract at least a portion of the turning-moment forces transmitted to the control gear to resist rotation of the control gear about the central axis relative to the fan disk so that rotation of the plurality of the fan blades about the fan-blade pivot axis due to the turning-moment forces is blocked during rotation of the fan rotor about the central axis, The counterforce system may be mounted to rotate about the central axis with the fan disk and may include a stabilizer gear, a first link arm, a second link arm, and a counterweight. The stabilizer gear may be coupled to the control gear and may be configured to selectively rotate relative to the fan disk. The first link arm may be coupled pivotably to the stabilizer gear and may be arranged to extend radially outward away from the stabilizer gear. The second link arm may be coupled pivotably to the first link arm and coupled pivotably to a fixed point that rotates with the fan disk. The counterweight may be coupled to one of the first link arm and the second link arm for movement therewith at a point spaced apart from the stabilizer gear. The counterweight may apply a centripetal force to the stabilizer gear which may be transmitted to the control gear to counteract the turning-moment forces acting on the control gear during rotation of the fan rotor about the central axis.

In some embodiments, each of the plurality of fan blades may include an airfoil, a spindle, and a spindle gear. The spindle may be coupled to the airfoil and may extend radially inward along the fan-blade pivot axis toward the central axis. The spindle gear may extend around the fan-blade pivot axis and may be coupled to the spindle for rotation therewith.

In some embodiments, the control gear may be meshed with the spindle gears. The control gear may be meshed with the stabilizer gear such that rotation of the control gear causes rotation of the stabilizer gear about the central axis relative to the fan rotor and rotation of the spindle gears about the corresponding fan-blade pivot axes to vary the pitch of each of the fan blades.

In some embodiments, at least one of the first link arm and the second link arm may be configured to lengthen and shorten selectively. In some embodiments, the at least one of the first link arm and the second link arm may include a linear actuator. In some embodiments, the other of the at least one of the first link arm and the second link arm may be configured to lengthen and shorten selectively independent of the at least one of the first link arm and the second link arm.

In some embodiments, the counterforce system may further include an actuator coupled to one of the control gear and the stabilizer gear. The actuator may be configured to rotate selectively the one of the control gear and the stabilizer gear about the central axis.

In some embodiments, the counterforce system may further include a third link arm, a fourth link arm, and a second counterweight. The third link arm may be coupled pivotably to the stabilizer gear and may be spaced apart from the first link arm. The fourth link arm may be coupled pivotably to the third link arm and may be coupled pivotably to a second fixed point that rotates with the fan disk. The counterweight may be coupled to one of the third link arm and the fourth link arm for movement therewith at a point spaced apart from the stabilizer gear.

According to another aspect of the present disclosure, a variable-pitch fan may include a fan rotor, a pitch controller, and a counterforce system. The fan rotor may be mounted for rotation about a central axis of the variable-pitch fan. The fan rotor may include a fan disk and a plurality of fan blades that extend radially outward relative to the central axis away from the fan disk along corresponding radially extending fan-blade pivot axes. Each of the plurality of fan blades may be configured to rotate about the corresponding fan-blade pivot axis between a closed position and a reverse-thrust position to vary a pitch of the fan blades. The pitch controller may be mounted to rotate about the central axis with the fan disk. The pitch controller may be coupled to the plurality of fan blades and may be configured to move selectively relative to the fan disk to cause the plurality of fan blades to rotate about the fan-blade pivot axes and vary the pitch of the plurality of fan blades.

The counterforce system may be mounted to rotate about the central axis with the fan disk. The counterforce system may be coupled to the pitch controller. The counterforce system may include a stabilizer unit, a linkage, and a counterweight. The stabilizer unit may be coupled to the pitch controller and configured to move selectively relative to the fan disk. The linkage may be coupled pivotably to the stabilizer unit and coupled pivotably to a fixed point that rotates with the fan disk. The counterweight may be coupled to the linkage for movement therewith.

In some embodiments, each of the plurality of fan blades may include an airfoil, a spindle, and a spindle gear. The spindle may be coupled to the airfoil and may extend radially inward along the fan-blade pivot axis toward the central axis. The spindle gear may extend around the fan-blade pivot axis and may be coupled to the spindle for rotation therewith.

In some embodiments, the pitch controller may include a control gear. The stabilizer unit may include a stabilizer gear. The control gear may be meshed with the spindle gears and meshed with the stabilizer gear such that rotation of the control gear causes rotation of the stabilizer gear about the central axis relative to the fan rotor and rotation of the spindle gears about the corresponding fan-blade pivot axes to vary the pitch of each of the fan blades.

In some embodiments, the counterforce system may further include an actuator coupled to one of the pitch controller and the stabilizer unit. The actuator may be configured to rotate selectively the one of the pitch controller and the stabilizer unit about the central axis.

In some embodiments, the linkage may include a first link arm coupled to the stabilizer unit and a second link arm coupled pivotably to the first link arm and to the fixed point. In some embodiments, at least one of the first link arm and the second link arm may be configured to lengthen and shorten selectively. In some embodiments, the at least one of the first link arm and the second link arm may include a linear actuator.

In some embodiments, the counterweight may be radially spaced apart from the stabilizer unit relative to the central axis. The counterweight may be integrally formed with linkage.

According to another aspect of the present disclosure, a variable-pitch fan may include a plurality of fan blades, a control gear, and a counterforce system. The plurality of fan blades may be mounted for rotation about a central axis of the variable-pitch fan. The plurality of fan blades may extend radially outward away from the central axis along corresponding radially extending fan-blade pivot axes. Each of the plurality of fan blades may be configured to rotate about the corresponding fan-blade pivot axis. The control gear may be mounted to rotate about the central axis with the plurality of fan blades. The control gear may be coupled to the plurality of fan blades and may be configured to move selectively relative to the plurality of fan blades to cause the plurality of fan blades to rotate about the fan-blade pivot axes.

The counterforce system may be mounted to rotate about the central axis with the plurality of fan blades. The counterforce system may be coupled to the control gear. The counterforce system may include a stabilizer gear, a linkage, and a counterweight. The stabilizer gear may be coupled to the control gear and may be configured to move selectively relative to the plurality of fan blades and relative to a fixed point that rotates with the plurality of fan blades. The linkage may be coupled pivotably to the stabilizer gear and coupled pivotably to the fixed point. The counterweight may be coupled to the linkage for movement therewith.

In some embodiments, the linkage may include a first link arm coupled to the stabilizer gear and a second link arm coupled pivotably to the first link arm and to the fixed point. In some embodiments, at least one of the first link arm and the second link arm may be configured to lengthen and shorten selectively.

In some embodiments, the counterforce system may further include an actuator coupled to one of the control gear and the stabilizer gear. The actuator may be configured to rotate selectively the one of the control gear and the stabilizer gear about the central axis.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
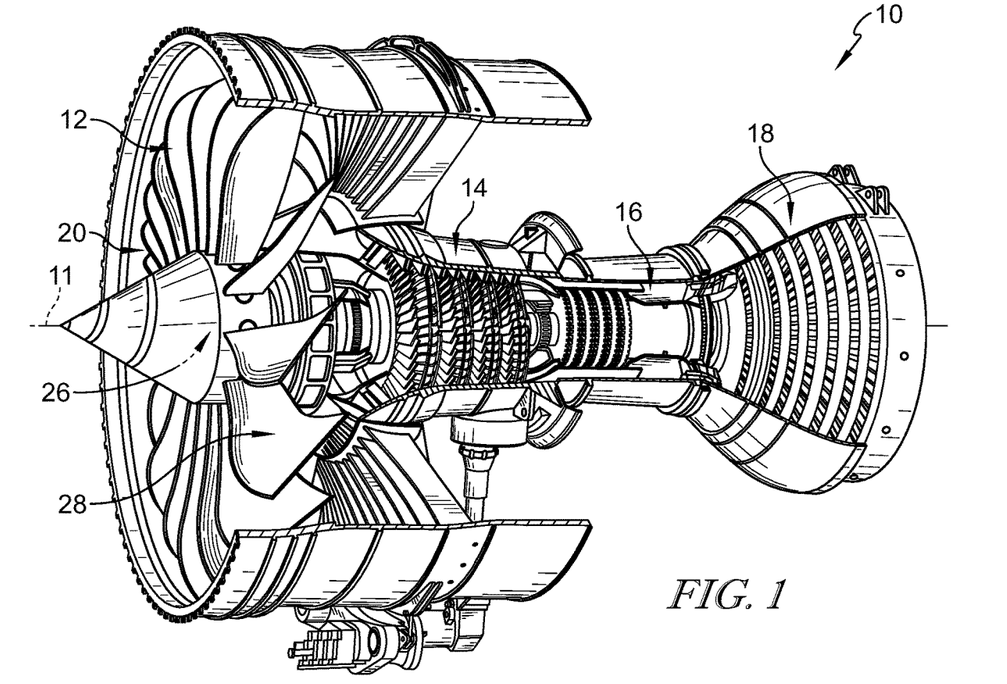
FIG. 1 is a cutaway view of a gas turbine engine that includes a variable-pitch fan, a compressor, a combustor, and a turbine, the variable-pitch fan including a plurality of fan blades mounted for rotation about a central axis of the gas turbine engine.

A gas turbine engine 10 having a variable-pitch fan 12 in accordance with the present disclosure is shown in FIG. 1. The gas turbine engine 10 includes a fan 12, a compressor 14, a combustor 16, and a turbine 18. The fan 12 is driven by the turbine 18 and provides thrust for propelling an aircraft. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 of the gas turbine engine 10 and drive the compressor 14 and the fan 12.

Figure 2:
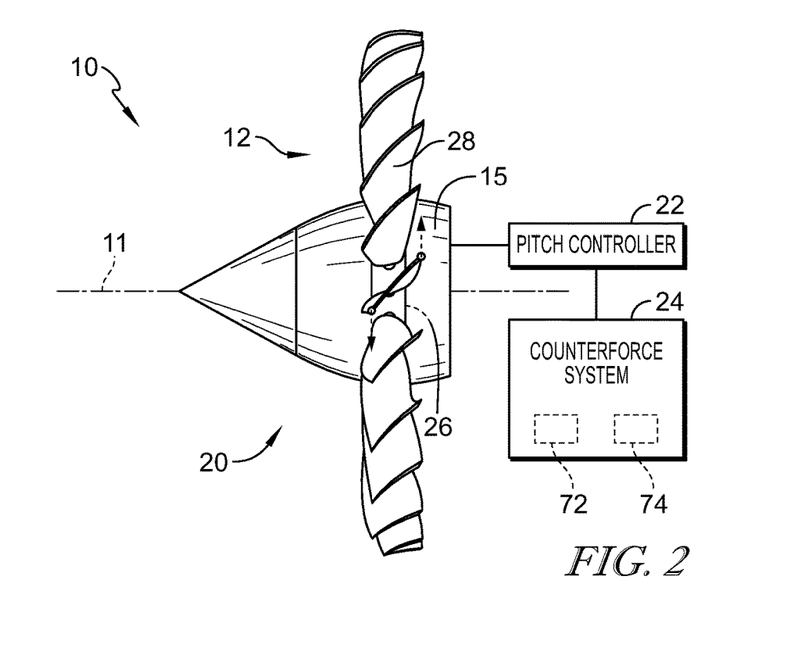
FIG. 2 is a side view of the variable-pitch fan of FIG. 1 showing that each fan blade is configured to rotate about a corresponding radially extending fan-pitch rotation axis to a set pitch position and suggesting that turning-moment forces are applied to the fan blades as the variable-pitch fan rotates which urge the fan blades to rotate away from their set pitch positions.
Figure 3:
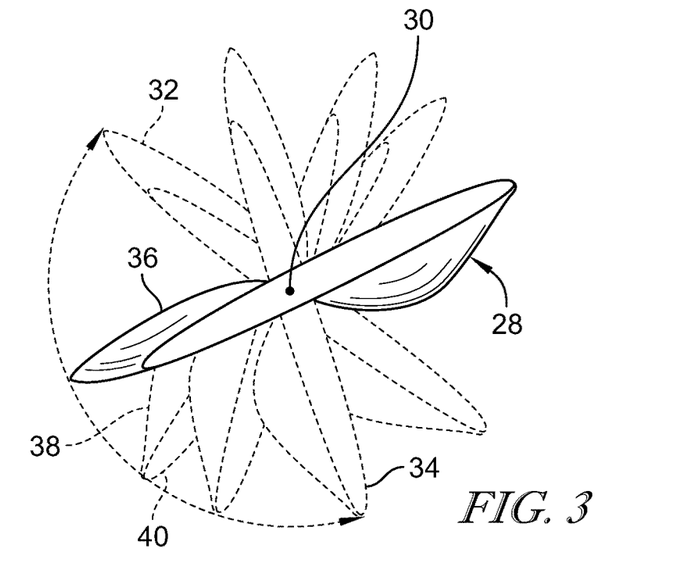
FIG. 3 is a perspective view of one of the fan blades of the variable-pitch fan suggesting that each fan blade is configured to rotate between a reverse thrust position and a closed position to vary the pitch of each fan blade for different operating conditions during use of the gas turbine engine.

The illustrative fan 12 is a variable-pitch fan 12 that includes a plurality of fan blades 28 and a pitch controller 22 both mounted to rotate about the central axis 11 as shown in FIGS. 1 and 2. The fan blades 28 are arranged circumferentially about the central axis 11 and are configured to rotate about corresponding radially extending fan-blade pivot axes 30 to change a pitch (sometimes called an incident angle) of the fan blades 28 as suggested in FIGS. 2 and 3. The pitch controller 22 is configured to vary and set the pitch of the fan blades 28 for different operating conditions during use of the gas turbine engine 10.

As one example, the pitch of the fan blades 28 may be varied to optimize fuel burn throughout a flight mission. The pitch of the fan blades 28 may be reversed to provide thrust reverse and reduce or eliminate the use of heavy thrust reverse units coupled to the engine nacelle. The fan blades 28 maybe feathered in the event of an engine failure to reduce drag or windmill loads.

As the fan 12 rotates about the central axis 11, turning-moment forces 15 are applied to the fan blades 28 and urge the fan blades 28 to pivot away from their set pitch positions. The turning-moment forces 15 are caused, at least in part, by centripetal forces of the fan blades 28 as the fan blades 28 rotate about the central axis 11. The fan blades 28 transmit the turning-moment forces 15 to the pitch controller 22 as a turning moment 17.

The variable-pitch fan 12 further includes a counterforce system 24 configured to counteract at least a portion of the turning moment 17 applied to the pitch controller 22 and, thus, counteract at least a portion of the turning-moment forces 15 applied to the fan blades 28 to resist rotation of the fan blades 28 due to the turning-moment forces 15. The at least a portion of the turning moment 17 counteracted by the counterforce system 24 can be less than the entire turning moment, the entire turning moment, and more than the entire turning moment. As a result, in some embodiments, the counterforce system 24 provides a counterforce torque equal to the turning moment 17. In some embodiments, the counterforce system 24 provides a counterforce torque greater than the turning moment 17.

Figure 5:
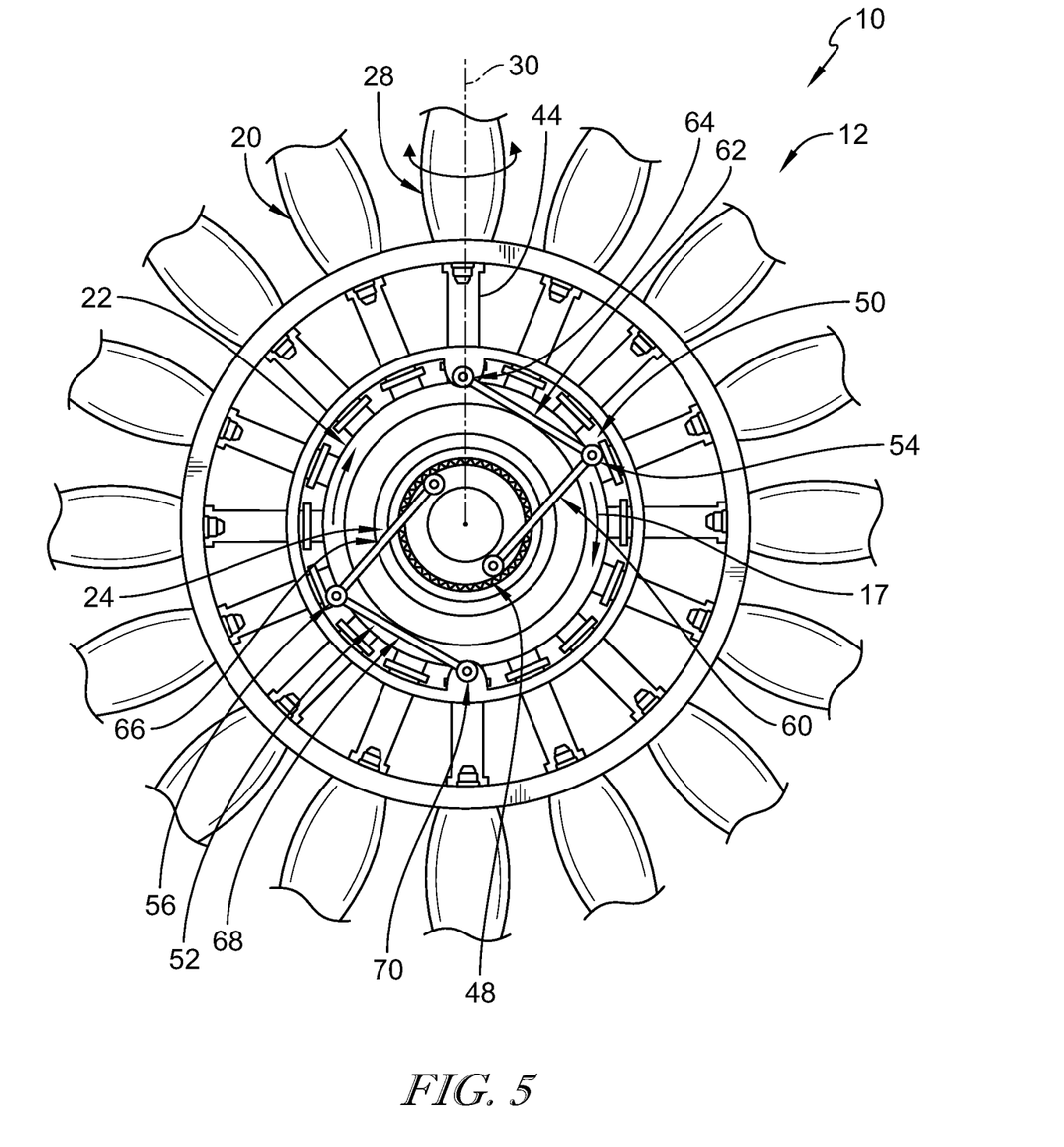
FIG. 5 is an elevation and diagrammatic view of an illustrative embodiment of the variable-pitch fan showing that the counterforce system includes a stabilizer gear, first and second linkages coupled to the stabilizer gear, and counterweights coupled to the linkages to impart a counterbalance force to the stabilizer gear in response to rotation of the fan to counteract the turning-moment forces applied to the fan blades.
Figure 6:
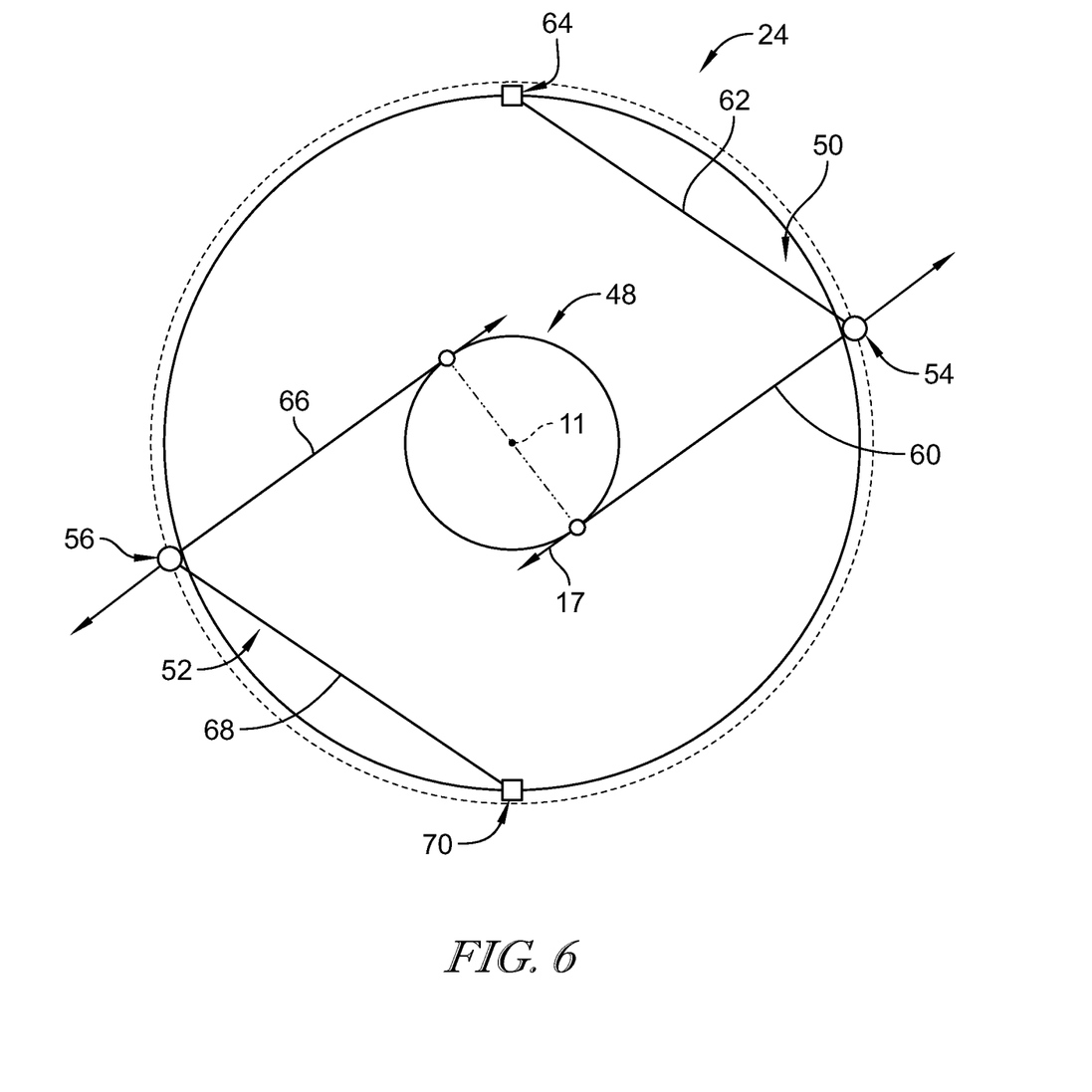
FIG. 6 is a diagrammatic view of the counterforce system included in the variable-pitch fan of FIG. 2 showing that the counterforce system includes a stabilizer unit mounted to rotate about the central axis, first and second linkages coupled to the stabilizer unit, and counterweights coupled to the first and second linkages to impart a torque onto the stabilizer unit in response to rotation of the variable-pitch fan.
Figure 7:
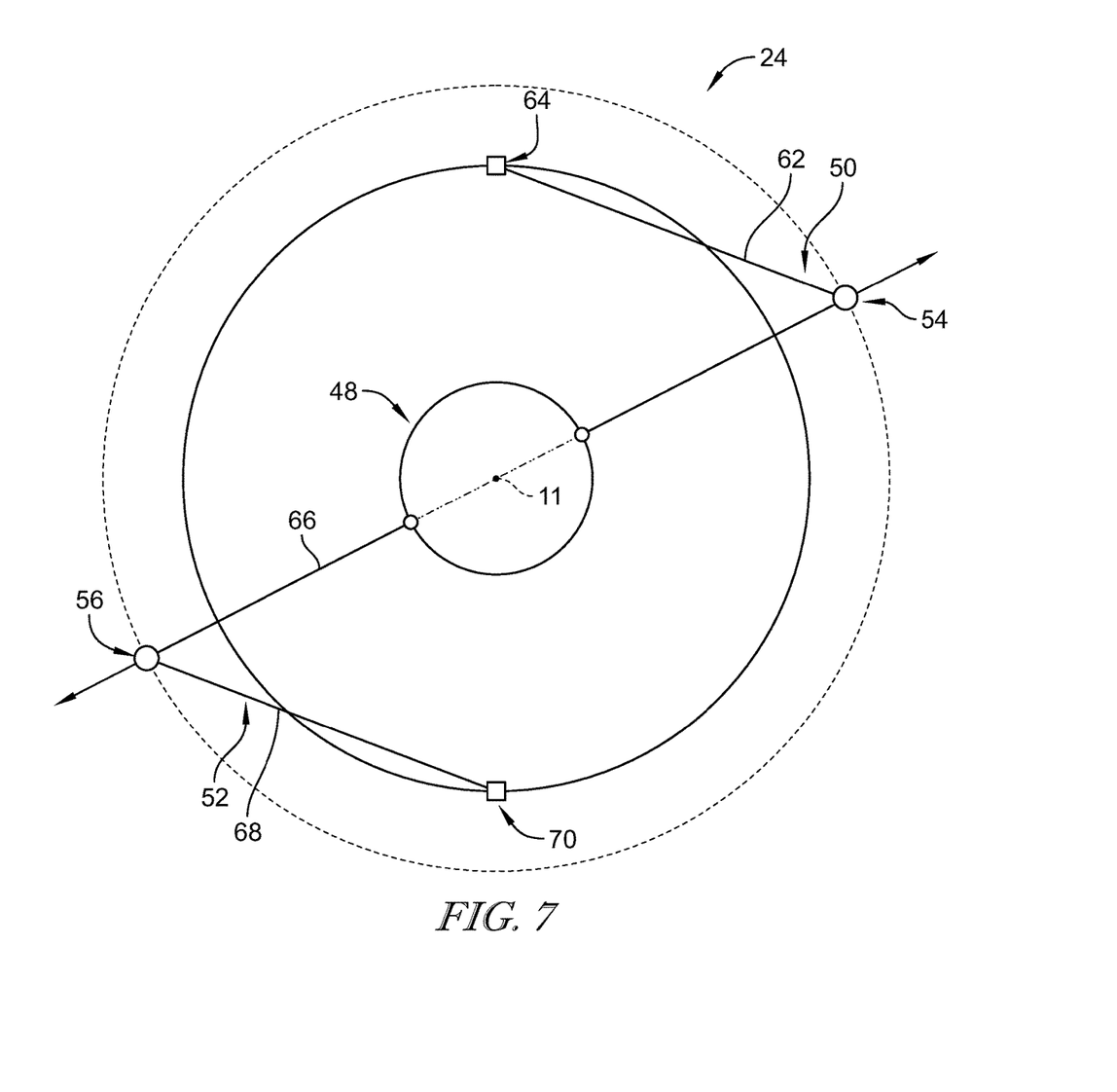
FIG. 7 is a view similar to FIG. 6 showing the counterforce system in another position in which the counterweights apply a relatively small torque or no torque to the stabilizer unit.

In the illustrative embodiment, the counterforce system 24 includes a stabilizer unit 48, a first linkage 50, a second linkage 52, and counterweights 54, 56 as shown in FIGS. 5-7. The stabilizer unit 48 is connected to the pitch controller 22 and is configured to selectively rotate the pitch controller 22 about the central axis 11 to cause the fan blades 28 to rotate about the fan-blade pivot axes 30 and, thus, change pitch. The first linkage 50 includes a first link arm 60 pivotably coupled to the stabilizer unit 48 and a second link arm 62 pivotably coupled to the first link arm 60 and to a fixed point that rotates with the fan blades 28 about the central axis 11. The second linkage 52 is similar to the first linkage 50 and illustratively is spaced about 180 degrees apart from the first linkage 50. The counterweights 54, 56 are coupled to the first and second linkages 50, 52 for movement therewith and apply centripetal forces to the stabilizer unit 48 as the counterforce system 24 rotates about the central axis 11 to counteract the turning-moment forces 15. In some embodiments, the counterweights 54, 56 are integrally formed with the linkages 50, 52.

Figure 4:
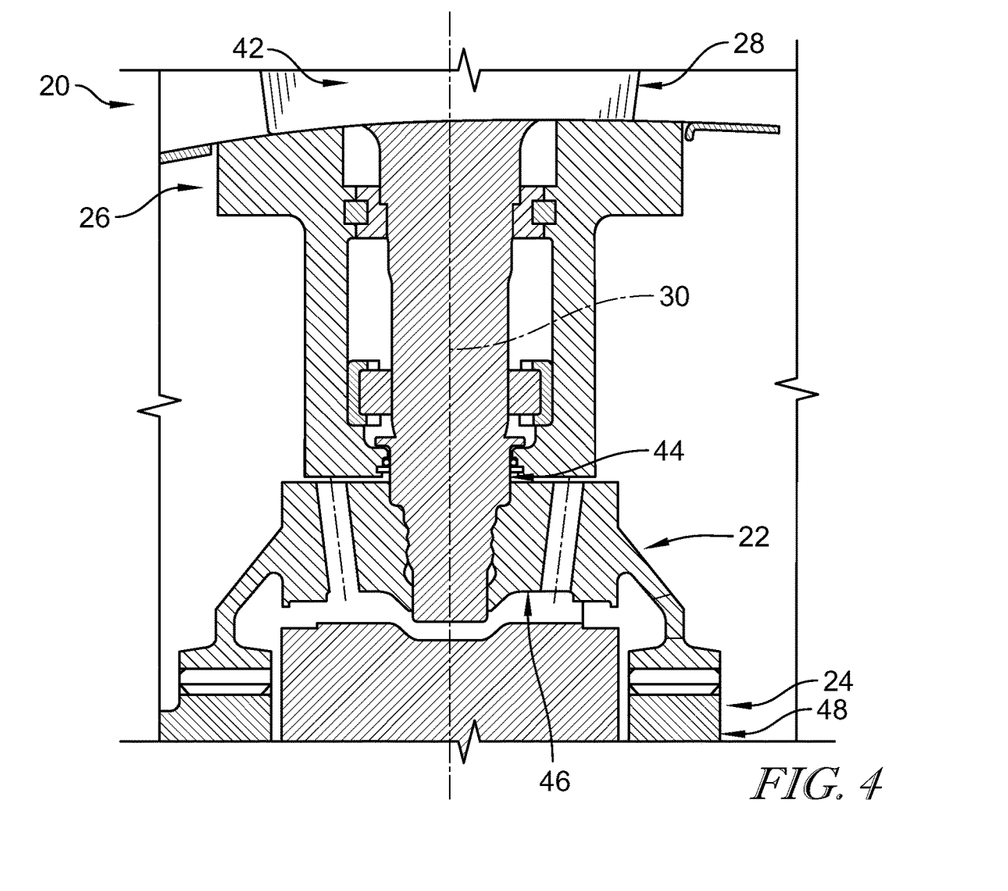
FIG. 4 is a sectional view of the variable-pitch fan of FIG. 2 showing that the variable-pitch fan further includes a pitch controller and a counterforce system, each fan blade is configured to rotate about a spindle, the pitch controller is coupled to the spindle to control the pitch of the fan blades, and the counterforce system is coupled to the pitch controller to counteract the turning-moment forces applied to the fan blades during rotation of the fan.

The illustrative variable-pitch fan 12 includes a fan rotor 20, the pitch controller 22, and the counterforce system 24 as shown in FIGS. 4 and 5. The fan rotor 20 is mounted for rotation about the central axis 11 to produce thrust for propelling an aircraft. The pitch controller 22 is coupled to the fan rotor 20 and configured to vary and set the pitch of the fan blades 28 included in the fan rotor 20. The counterforce system 24 is coupled to the pitch controller 22 and configured to counteract at least a portion of the turning-moment forces 15 applied to the fan blades 28 and the pitch controller 22 to block the turning-moment forces 15 from changing the pitch of the fan blades 28.

The illustrative fan rotor 20 includes a fan disk 26 and a plurality of fan blades 28 as shown in FIGS. 2 and 4. The fan blades 28 extend radially outward away from the fan disk 26 relative to the central axis 11 along radially extending fan-blade pivot axes 30 as shown in FIGS. 2 and 4. Each fan blade 28 is configured to rotate selectively about its corresponding fan-blade pivot axis 30 between and including a reverse thrust position 32 and a closed position 34 to vary the pitch of the fan blade 28 as suggested in FIG. 3. Each fan blade 28 is movable selectively to a plurality of positions between the reverse thrust position 32 and the closed position 34, including a feather position 36, a max takeoff (MTO) position 38, and a top of climb (TOC) position 40 as suggested in FIG. 3.

The pitch of the fan blades 28 may be selected based on engine conditions and flight conditions to increase an efficiency of the gas turbine engine 10. The turning-moment forces 15 applied to the fan blades 28 urge the fan blades 28 toward the closed position 34 during rotation of the fan rotor 20 about the central axis 11 as suggested in FIG. 2. Relatively low or no turning-moment forces 15 are applied to the fan blades 28 when the fan blades 28 are in the feather position 36 or the closed position 34.

Each fan blade 28 illustratively includes an airfoil 42, a spindle 44, and a spindle gear 46 as shown in FIG. 4. The airfoil 42 is configured to push air and create thrust when the variable-pitch fan 12 rotates. The spindle 44 extends along the fan-blade pivot axis 30 and the spindle 44 is configured to rotate about the pivot axis 30. The spindle gear 46 extends around the fan-blade pivot axis 30 and is coupled to the spindle 44 for rotation therewith. The spindle gears 46 are engaged by and rotated by the pitch controller 22 to vary and set the pitch of the fan blades 28.

The pitch controller 22 is mounted to rotate about the central axis 11 with the fan disk 26 as suggested in FIGS. 4 and 5. The pitch controller 22 is configured to selectively move relative to the fan disk 26 to cause the spindle gears 46 to rotate the fan blades 28 about the fan-blade pivot axes 30 and vary the pitch of the fan blades 28. In the illustrative embodiment, the pitch controller 22 rotates about the central axis 11 relative to the fan disk 26.

The illustrative pitch controller 22 includes a control gear 22 that is meshed with the spindle gears 46 of the fan blades 28. In the illustrative embodiment, the control gear 22 and the spindle gears 46 form a bevel gear arrangement.

In other embodiments, the pitch controller 22 includes other suitable mechanisms for engaging and rotating the fan blades. In some embodiments, the fan blades include trunnions and the pitch controller includes a drum coupled with the trunnions and an actuator configured to rotate the drum to cause the drum to move the trunnions such that the fan blades rotate about their pivot axes.

The turning-moment forces 15 applied to the fan blades 28 are transmitted through the fan blades 28 to the pitch controller 22 during rotation of the variable-pitch fan 12. As a result, the fan blades 28 apply the turning moment 17 to the pitch controller 22 which urges the pitch controller 22 to rotate about the central axis 11 relative to the fan disk 26. The counterforce system 24 is connected to the pitch controller 22 and configured to counteract at least a portion of the turning moment 17 transmitted to the pitch controller 22 to block rotation of the pitch controller 22 about the central axis 11 relative to the fan disk 26. As a result, rotation of the plurality of the fan blades 28 about the fan-blade pivot axes 30 due to the turning-moment forces is blocked and their set pitch is maintained during rotation of the fan rotor 20 about the central axis 11.

An illustrative embodiment of the counterforce system 24 is shown in FIG. 5. Diagrammatic views of the counterforce system 24 are shown in FIGS. 6 and 7. FIGS. 5 and 6 show the counterforce system 24 in a first position in which the fan blades 28 have a pitch between the feather position 36 and the fully closed position 34. As such, turning-moment forces 15 are applied to the fan blades 28 and the counterforce system 24 is configured to apply a counterforce to the pitch controller 22 to counteract the turning-moment forces 15. FIG. 7 shows the counterforce system 24 in a second position in which the fan blades 28 are pitched in the feather position 36. As such, the turning-moment forces 15 are low or zero and the counterforce system 24 is configured to apply a low or no counterforce to the pitch controller 22.

The counterforce system 24 is mounted to rotate about the central axis 11 with the fan disk 26 as suggested in FIGS. 4-7. The counterforce system 24 includes the stabilizer unit 48, the first linkage 50, the second linkage 52, the first counterweight 54, and the second counterweight 56. The stabilizer unit 48 is coupled to the pitch controller 22 and the first and second linkages 50, 52 are coupled to the stabilizer unit 48. The counterweights 54, 56 are coupled to the linkages 50, 52 respectively and apply a centrifugal force to the linkages 50, 52 in response to rotation of the variable-pitch fan 12. The linkages 50, 52 are spaced apart from the central axis 11 to provide leaver arms that use the centrifugal force of the counterweights 54, 56 to apply a torque to the stabilizer unit 48 that counteracts the turning-moment forces applied to the fan blades 28 and pitch controller 22.

In the illustrative embodiment shown in FIG. 5, the stabilizer unit 48 includes a stabilizer gear 48. The stabilizer gear 48 is meshed with the control gear 22 of the pitch controller 22 as shown in FIG. 4. In other embodiments, the stabilizer unit 48 may be any other suitable alternative feature coupled to the pitch controller 22 as suggested in FIGS. 6 and 7. As an example, the stabilizer unit 48 may be a disk, ring, cam, or body coupled to the pitch controller 22 by keys, teeth, pins, or any suitable alternative means. In some embodiments, the stabilizer unit 48 and the pitch controller 22 are integrally formed.

The stabilizer unit 48 is mounted to rotate with the fan disk 26 as suggested in FIGS. 5-7. The stabilizer unit 48 is coupled to the pitch controller 22 such movement is transferred between the stabilizer unit 48 and the pitch controller 22. The stabilizer unit 48 is further configured to move selectively relative to the fan disk 26.

Illustratively, the stabilizer unit 48 is coupled to the pitch controller 22 such that rotational motion about the central axis 11 is transferred between the stabilizer unit 48 and the pitch controller 22 as suggested in FIGS. 4 and 5. The stabilizer unit 48 is further configured to selectively rotate partway about the central axis 11 relative to the fan disk 26. As such, rotation of the stabilizer unit 48 about the central axis 11 relative to fan disk 26 causes the pitch controller 22 to rotate about the central axis 11 relative to the fan disk 26 and vary the pitch of the fan blades 28.

The first linkage 50 includes a first link arm 60 and a second link arm 62 as shown in FIGS. 5-7. The first link arm 60 is coupled pivotably to the stabilizer gear 48 and arranged to extend radially outward away from the stabilizer gear 48 relative to the central axis 11. The second link arm 62 is coupled pivotably to the first link arm 60 and coupled pivotably to a first fixed point 64 that rotates with the fan disk 26. As such, the second link arm 62 may be coupled to a first fixed point 64 included in one of a number of components that rotate with the fan disk 26 including the fan disk 26 itself.

The second linkage 52 includes a third link arm 66 and a fourth link arm 68 as shown in FIGS. 5-7. The third link arm 66 is coupled pivotably to the stabilizer gear 48 and arranged to extend radially outward away from the stabilizer gear 48 relative to the central axis 11. The fourth link arm 68 is coupled pivotably to the third link arm 66 and coupled pivotably to a second fixed point 70 that rotates with the fan disk 26. As such, the fourth link arm 68 may be coupled to a second fixed point 70 included in one of a number of components that rotate with the fan disk 26 including the fan disk 26 itself.

Illustratively, the third link arm 66 is coupled to the stabilizer gear 48 about 180 degrees apart from the first link arm 60 and the first fixed point 64 is spaced apart from the second fixed point 70 by about 180 degrees as shown in FIG. 5. The illustrative counterforce system 24 includes two linkages 50, 52 as shown in FIGS. 5-7. In other embodiments, the counterforce system 24 may include any number of linkages including one or more linkages. In some embodiments, the linkages are spaced apart from one another by about equal distances.

In the illustrative embodiment, the link arms 60, 62, 66, 68 are beam or bar shaped as shown in FIG. 5. Link arms 60, 62, 66, 68 are represented diagrammatically in FIGS. 6 and 7 because each link arm 60, 62, 66, 68 may take on one of number of suitable shapes. As an example, each link arm 60, 62, 66, 68 may be shaped with varying widths, curves, and linear portions.

The first counterweight 54 is coupled to the first linkage 50 and the second counterweight 56 is coupled to the second linkage 52 as shown in FIGS. 5-7. In illustrative embodiments, the first counterweight 54 is coupled to the second link arm 62 for movement therewith. The second counterweight 56 is coupled to the fourth link arm 68 for movement therewith. The first counterweight 54 is coupled to at least one of the link arms 60, 62 near where the link arms 60, 62 join together. The second counterweight 56 is coupled to the link arms 66, 68 near where the link arms 66, 68 join together. In some embodiments, the counterweights 54, 56 are integrally formed as a single component with the linkages 50, 52, 54, 56.

The counterweights 54, 56 apply a centripetal force to the linkages 50, 52 which apply a torque to the stabilizer gear 48 during rotation of the fan rotor 20 about the central axis 11. The torque applied to the stabilizer gear 48 counteracts the turning moment 17 acting on the control gear 22 during rotation of the fan rotor 20 about the central axis 11. As a result, the counterforce system 24 resists rotation of the fan blades 28 away from their set pitch position.

In some embodiments, the counterweights 54, 56 and linkages 50, 52 are designed to apply a non-zero moment to the stabilizer unit 48 about equal to the turning moment 17 applied to the pitch controller 22 by the fan blades 28 during rotation of the variable-pitch fan 12 for at least one of the pitch positions of the fan blades 28 and at least one rotational speed of the fan 12. In some embodiments, the at least one pitch position is not the feather position 36. In some such embodiments, the counterforce system 24 includes an actuator 72 configured to change the pitch of the fan blades 28.

When the fan blades 28 are in a non-feather position as shown in FIGS. 5 and 6, the turning-moment forces 15 acting on the fan blades 28 are greater than zero. The counterforce system 24 is configured such that the centripetal forces applied to the stabilizer unit 48 are offset with the central axis 11 so that the centripetal forces apply a torque to the stabilizer unit 48 which is transmitted to the pitch controller 22. The counterforce system 24 is configured to apply a torque to the stabilizer unit 48 when the fan blades 28 are rotated toward either the reverse thrust position 32 or the closed position 34.

When the fan blades 28 are in the feather position 36 as shown in FIG. 7, the turning-moment forces 15 acting on the fan blades 28 are about zero. The counterforce system 24 is configured such that the centripetal forces applied to the stabilizer unit 48 are aligned radially with the central axis 11 when the fan blades 28 are in the feather position so that the centripetal forces apply about zero moment to the stabilizer unit 48.

As shown in FIG. 7, the first and third link arms 60, 66 are collinear with the centripetal force in the illustrative embodiment. As a result, once in the feather position 36, the fan blades 28 are not urged away from the feather position 36 by the turning-moment forces 15 or the centripetal forces 25.

In some embodiments, the counterforce system 24 provides a means of overspeed protection. In some embodiments, the counterforce system 24 includes an active control and the means of overspeed protection includes a locking system 74 to fix pitch at a certain angle. In the event the active control failed, the fan blade 28 pitch would lock in its current state.

In some embodiments, once the engine was no longer desired to produce forward thrust, the locking system 74 could be unlocked and the fan blades 28 would return to the feather stated 36 as a result of the net forces acting on the fan blades 28. Once the fan blades 28 are moved to the feather position 36, the fan blades 28 would feathered as discussed above.

In some embodiments, the counterweights 54, 56 and linkages are designed to apply a torque to the stabilizer unit 48 that counteract a portion of the turning moment 17 applied to the pitch controller 22 and the counterforce system 24 further includes at least one actuator 72 coupled to the pitch controller 22 and/or the stabilizer unit 48. The at least one actuator 72 is configured to apply another torque to the stabilizer unit 48 and/or the pitch controller 22 to counteract another portion of the turning moment 17 applied to the pitch controller 22 by the fan blades 28. As such, the actuator 72 and the counterweights 54, 56 cooperate to counteract the turning-moment forces 15.

In some embodiments, the actuator 72 is further configured to rotate the pitch controller 22 and/or the stabilizer unit 48 about the central axis 11 relative to the fan disk 26 to change a pitch of the fan blades 28. In some embodiments, the actuator 72 includes a linear actuator. In some embodiments, the actuator 72 includes a rotary actuator.

In some embodiments, one or more of the link arms 60, 62, 66, 68 can vary its length selectively and independently of the other link arms 60, 62, 66, 68. As such, the one or more link arm 60, 62, 66, 68 can lengthen and shorten. In some such embodiments, the one or more link arm 60, 62, 66, 68 includes an actuator configured to vary the length of the one or more link arm 60, 62, 66, 68. In some embodiments, the lengths of the link arms 60, 62, 66, 68 are varied at the same rate.

The length of the link arms 60, 62, 66, 68 can be varied to adjust the centripetal force applied to the linkages and, thus, the torque applied to the stabilizer unit 48 is adjusted by the length of the link arms 60, 62, 66, 68. For example, by lengthening the first and third link arms 60, 66, the counterweights 54, 56 move radially outward such that the centripetal force for a given rotational speed of the counterforce system 24 is increased.

As a result, the length of the link arms 60, 62, 66, 68 can be varied to change the pitch of the fan blades 28. For example, the length of the first and third link arms 60, 66 could be increased so that the torque applied to the stabilizer unit 48 by the counterweights 54, 56 is greater than the turning moment 17 applied through the fan blades 28. As a result, the stabilizer unit 48 would rotate about the central axis 11 relative to the fan disk 26 and cause the pitch controller 22 to rotate the fan blades 28 changing the pitch of the fan blades 28. Likewise, the lengths of the first and third link arms 60, 66 could be decreased so that the turning moment 17 applied through the fan blades 28 is greater than the torque applied to the stabilizer unit 48 by the counterweights 54, 56 to change the pitch of the fan blades 28 in the opposite direction. The length of the second and fourth link arms 62, 68 could also be varied to change the centripetal force and pitch of the fan blades 28.

In some embodiments with fixed length arms 60, 62, 66, 68 or variable length link arms 60, 62, 66, 68, the counterforce system 24 is configured to apply a torque to the stabilizer unit 48 that is greater than the turning moment 17 to urge the fan blades 28 toward feather. In some such embodiments, the actuator 72 resists the torque applied by the counterweights 54, 56 to block the fan blades 28 from rotating about the fan-blade pivot axes 30.

Figure 8:
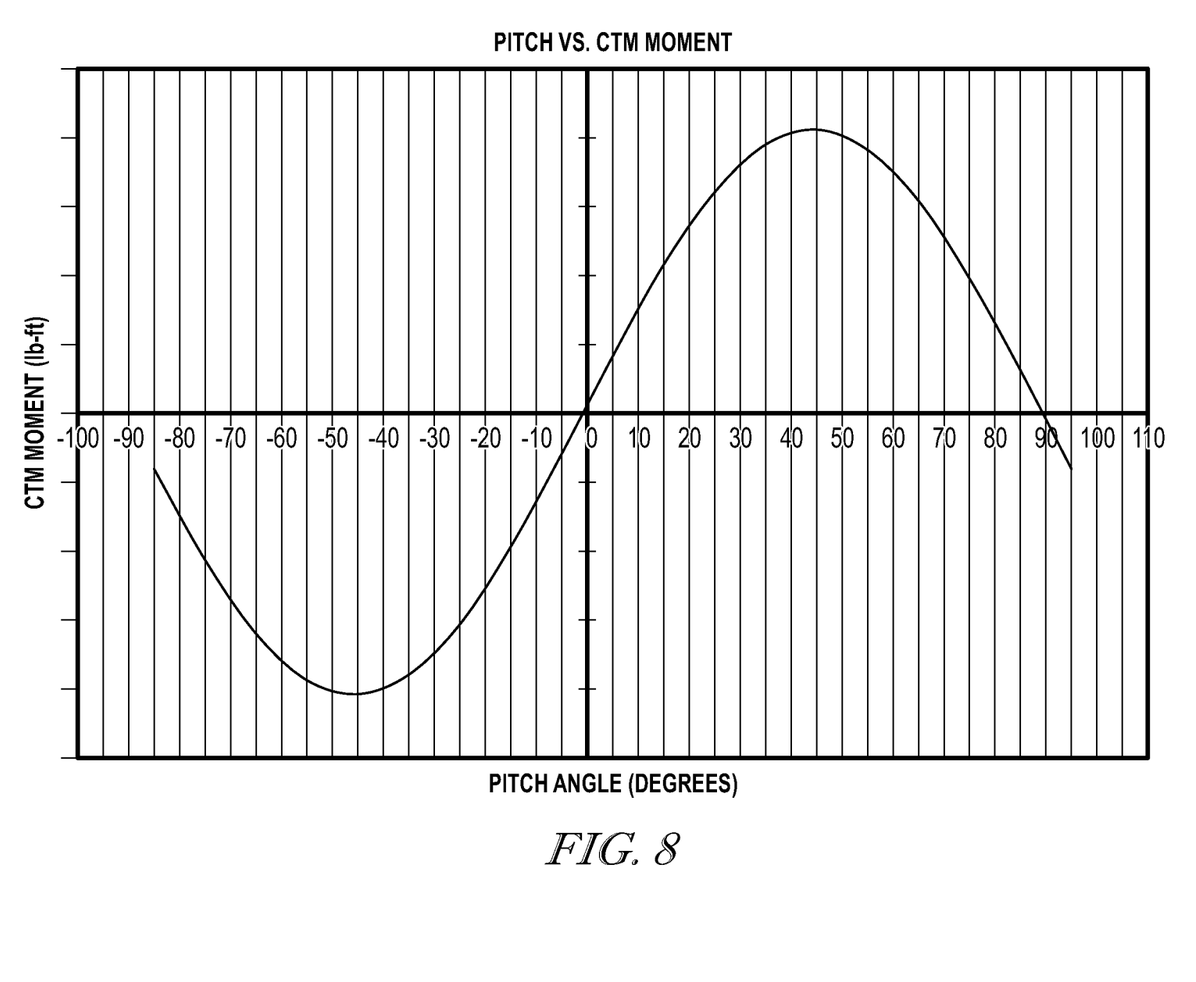
FIG. 8 is a chart showing the relative turning-moment forces applied to the fan blades at different pitch angles relative to feather.
Figure 9:
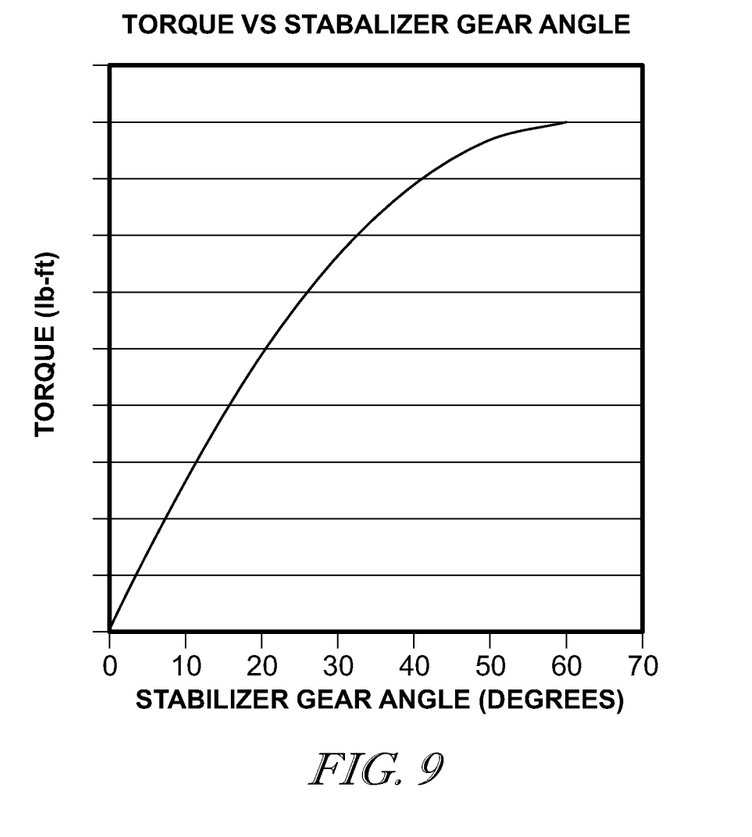
FIG. 9 is a chart showing relative torque applied to the pitch controller by the counterforce system at different fan blade pitch angles.

FIG. 8 is a chart showing the relative moment applied to the fan blades 28 for different pitch angles of one embodiment of the present variable-pitch fan 12. As shown in FIG. 8, the turning-moment forces 15 and moment applied to the fan blades 28 is about zero at about the zero degree pitch (feather) and at about the 90 degree pitch (closed position). FIG. 9 is a chart showing the relative torque applied to the stabilizer unit 48 and pitch controller 22 for different gear angles of one embodiment of the variable-pitch fan 12. As shown in FIG. 9, the torque is about zero when the stabilizer unit 48 has a zero degree rotation. In some embodiments, the counterforce system 24 is configured such that the line for torque for a given gear angle shown in FIG. 9 is about equal to the line for turning moments for different pitch angles shown in FIG. 8 so that the counterforce system 24 provides a torque that is about equal to the turning moment.

Variable-pitch fans may offer benefits over fixed pitch fan designs. The fan blade pitch may be varied to optimize fuel burn throughout a flight of an aircraft powered by the gas turbine engine. In some embodiments, the pitch of the fan blades 28 may be reversed to provide thrust reverse which may eliminate the relatively heavy thrust reverse units fitted to a nacelle of the aircraft. In the event of failure of the fan 12, the fan blades 28 may be feathered to reduce drag or windmill loads.

Varying pitch of a blade may be challenging due to the centrifugal turning moment (CTM) generated by the blades 28. During forward thrust, the fan blades 28 may be pitched at semi-closed (sliced) states. This semi-closed state may produce a turning moment about the pitch change axis 30 of the fan blade 28 that wants to flatten the blade 28 (fully closed/fully sliced). The turning moment is sometimes referred to as centrifugal turning moment (CTM).

The centrifugal turning moment may be zero when the fan blades are positioned in feathered and fully closed pitch states. The centrifugal turning moment may be greater than zero when the fan blades are positioned in pitch states between the feathered and fully closed pitch states.

To hold the fan blades in position at pitch states between feather and fully closed, the pitch change mechanism may produce an equal and opposite force to counteract the centrifugal turning moment. In some embodiments, the pitch change mechanism is in the form of hydraulic/electric control.

Some pitch change concepts use hydraulic pistons or multiple hydraulic rotary actuators to produce a large torque level. Such concepts may be difficult to include in the limited design space within the nosecone and inner annulus of the engine. Counterweights may be attached to the blade spindles just below the annulus to counteract this centrifugal turning moment. This may be useful when the active system fails, the centrifugal turning moment of the counterweights may prevent the blades from further closure which may lead to overspeed.

The present disclosure provides counterweight systems to aid in fan blade pitch control. The system may be adapted as a passive system (i.e. speed based), adapted as an active system by varying mass or component geometry, or as a combination active and passive system. In some embodiments, counterweights are positioned around the engine axis of rotation. As the speed increases, the counterweights provide a centripetal force load that imparts a torque on a gear arrangement. This gear arrangement may then be connected to the gearing used to vary blade pitch. Fan blade centrifugal turning moment transferred through the gearing arrangement may be cancelled out by torque generated by the counterweights.

One state of the system, the fan blade is in a feather state where centrifugal turning moment may be about zero. The second link arm is connected to a fixed point. This point may be fixed in the rotating reference frame of the fan shaft. A mass is coupled to the end of the second link arm. The first link arm then connects the mass to the rotating gear at a pinned connection. As the fan rotates, the mass generates a centripetal force which is transferred into a tension force along the second link arm. In the feathered state, the centripetal force is collinear with the first link arm, which generates little or no tangential force on the gear and therefore little or no torque is imparted.

When the fan blade pitch is varied from feather to a partially closed position, the gearing arrangement rotates by an angle theta. As the gearing rotates, the centripetal force load imparts a load into the first link arm which generates tangential force on the gear. This may be considered a restoring torque (torque applied opposite the direction of rotation). The radius of rotation of the mass may decrease when the gearing arrangement rotates. The decreased radius of rotation of the mass may decrease the centripetal force load, but the tangential force may increase on the gear due to the orientation of the first link arm being more tangential to the gear. Thus, a resultant net torque is applied.

The restoring toque is applied no matter the direction from feather the blade is rotated. For example, if the blade pitches toward forward, there is an restoring torque opposite of the centrifugal turning moment and if the blade pitches toward reverse, there is a restoring torque opposite of the centrifugal turning moment.

In the illustrative embodiment, the counterforce system includes a second linkage/mass arrangement connected to an opposing gear pin about 180 degrees apart from the first linkage/mass arrangement. This may balance the counterforce system and may double the torque applied to the gear.

In some embodiments, the lengths of the first and second link arms and the magnitude of the mass are fixed. In other embodiments, the lengths of the first and second link arms and the magnitude of the mass are variable to provide active control of pitch. For example as the gear rotates, the first and/or second link arms could lengthen to provide a greater centripetal force load and, therefore, a greater torque on the gear. A fixed system may provide a passive system, but such passive system may be used in conjunction with an active control system with a relatively smaller size than previous concepts.

The counterforce system may be adopted to prevent overspeed conditions. If the counterforce system is designed to provide a greater restoring force than the centrifugal turning moment of the fan blades, in the event the active system fails, the fan blades are returned to a feather state, thus possibly preventing overspeed.

The counterforce system may allow a size of the active control system to be reduced. Typical active controls may use large hydraulic drivers to impart a counteractive centrifugal turning moment torque. The counterforce system of the present disclosure may provide an equal and opposite torque to the centrifugal turning moment, thus a relatively small force may be needed to change pitch. As such, a size and/or weight of the hydraulic driver(s) may be reduced The counterforce system may provide a means of overspeed protection. Some fans use a locking mechanism within the active control to fix pitch at a certain angle. In the event active control failed, the fan blade pitch would lock in its current state. While such a lock may help if the locked state is desired (i.e forward pitch for forward thrust), in the event of engine shutdown this may increase drag on the aircraft. A passive system that restores the pitch to feather may reduce windmill. In some embodiments, a locking mechanism may be used with the proposed counterforce system. Once the engine was no longer required to produce forward thrust, the system could be unlocked and the blades would return to a feather stated. Once feathered, they would remain feathered.

FIG. 8 shows how centrifugal turning moment varies as blade pitch varies at a constant speed. The centrifugal turning moment for a given pitch may depend on blade design/mass and shaft RPM. FIG. 9 shows gear torque as a function of rotation for a given fixed link and fixed mass setup. As discussed earlier, as gear angle increases, so does the restoring torque. Once a certain angle is reached, the torque may begin to reduce. The value of the torque may be a function of speed, linkage length, and mass.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A variable-pitch fan for use with a gas turbine engine, the variable-pitch fan comprising
    a fan rotor mounted for rotation about a central axis of the variable-pitch fan to produce thrust, the fan rotor including a fan disk and a plurality of fan blades that extend radially outward relative to the central axis away from the fan disk along corresponding radially extending fan-blade pivot axes, each of the plurality of fan blades being configured to rotate about the corresponding radially extending fan-blade pivot axis between a closed position and a reverse-thrust position to vary a pitch of the plurality of fan blades, wherein turning-moment forces are applied to each of the plurality of fan blades which urge each of the plurality of fan blades toward the closed position during rotation of the fan rotor about the central axis,
    a pitch controller configured to change the pitch of the plurality of fan blades, the pitch controller mounted to rotate about the central axis with the fan disk and including a control gear connected to the plurality of fan blades, and the control gear configured to selectively rotate partway about the central axis relative to the fan disk to cause the plurality of fan blades to rotate about the radially extending fan-blade pivot axes and vary the pitch of the plurality of fan blades, wherein the plurality of fan blades transmit the turning-moment forces to the control gear to urge the control gear to rotate about the central axis relative to the fan disk during rotation of the fan rotor about the central axis, and
    a counterforce system connected to the control gear and configured to counteract a portion of the turning-moment forces transmitted to the control gear to resist rotation of the control gear about the central axis relative to the fan disk so that rotation of the plurality of the plurality of fan blades about the radially extending fan-blade pivot axis due to the turning-moment forces is blocked during rotation of the fan rotor about the central axis,
    wherein the counterforce system is mounted to rotate about the central axis with the fan disk and includes a stabilizer gear, a first link arm, a second link arm, and a counterweight, the stabilizer gear is coupled to the control gear and configured to selectively rotate relative to the fan disk, the first link arm is coupled pivotably to the stabilizer gear and arranged to extend radially outward away from the stabilizer gear, the second link arm is coupled pivotably to the first link arm and coupled pivotably to a fixed point that rotates with the fan disk, the counterweight is coupled to one of the first link arm and the second link arm for movement therewith at a point spaced apart from the stabilizer gear, whereby the counterweight applies a centripetal force to the stabilizer gear which is transmitted to the control gear to counteract the turning-moment forces acting on the control gear during rotation of the fan rotor about the central axis.

2. The variable-pitch fan of claim 1, wherein each of the plurality of fan blades includes an airfoil, a spindle, and a spindle gear, the spindle is coupled to the airfoil and extends radially inward along the radially extending fan-blade pivot axis toward the central axis, and the spindle gear extends around the radially extending fan-blade pivot axis and is coupled to the spindle for rotation therewith.

3. The variable-pitch fan of claim 2, wherein the control gear is meshed with the spindle gears and meshed with the stabilizer gear such that rotation of the control gear causes rotation of the stabilizer gear about the central axis relative to the fan rotor and rotation of the spindle gears about the corresponding radially extending fan-blade pivot axes to vary the pitch of each of the plurality of fan blades.

4. The variable-pitch fan of claim 1, wherein at least one of the first link arm and the second link arm is configured to lengthen and shorten selectively.

5. The variable-pitch fan of claim 4, wherein the at least one of the first link arm and the second link arm includes a linear actuator configured to cause the at least of the first link arm and the second link arm to lengthen and shorten selectively.

6. The variable-pitch fan of claim 4, wherein the other of the at least one of the first link arm and the second link arm is configured to lengthen and shorten selectively independent of the at least one of the first link arm and the second link arm.

7. The variable-pitch fan of claim 1, wherein the counterforce system further includes an actuator coupled to one of the control gear and the stabilizer gear and the actuator is configured to rotate selectively the one of the control gear and the stabilizer gear about the central axis.

8. The variable-pitch fan of claim 1, wherein the counterforce system further includes a third link arm, a fourth link arm, and a second counterweight, the third link arm is coupled pivotably to the stabilizer gear and spaced apart from the first link arm, the fourth link arm is coupled pivotably to the third link arm and coupled pivotably to a second fixed point that rotates with the fan disk, the second counterweight is coupled to one of the third link arm and the fourth link arm for movement therewith at a point spaced apart from the stabilizer gear.

9. A variable-pitch fan for use with a gas turbine engine, the variable-pitch fan comprising
a fan rotor mounted for rotation about a central axis of the variable-pitch fan, the fan rotor including a fan disk and a plurality of fan blades that extend radially outward relative to the central axis away from the fan disk along corresponding radially extending fan-blade pivot axes, each of the plurality of fan blades being configured to rotate about the corresponding radially extending fan-blade pivot axis between a closed position and a reverse-thrust position to vary a pitch of the plurality of fan blades,
a pitch controller mounted to rotate about the central axis with the fan disk, the pitch controller coupled to the plurality of fan blades and configured to move selectively relative to the fan disk to cause the plurality of fan blades to rotate about the radially extending fan-blade pivot axes and vary the pitch of the plurality of fan blades, and
a counterforce system mounted to rotate about the central axis with the fan disk, the counterforce system coupled to the pitch controller, and the counterforce system including a stabilizer unit, a linkage, and a counterweight, the stabilizer unit coupled to the pitch controller and configured to move selectively relative to the fan disk, the linkage coupled pivotably to the stabilizer unit and coupled pivotably to a fixed point that rotates with the fan disk, and the counterweight coupled to the linkage for movement therewith.

10. The variable-pitch fan of claim 9, wherein each of the plurality of fan blades includes an airfoil, a spindle, and a spindle gear, the spindle is coupled to the airfoil and extends radially inward along the radially extending fan-blade pivot axis toward the central axis, and the spindle gear extends around the radially extending fan-blade pivot axis and is coupled to the spindle for rotation therewith.

11. The variable-pitch fan of claim 10, wherein the pitch controller includes a control gear, the stabilizer unit includes a stabilizer gear, the control gear is meshed with the spindle gears and meshed with the stabilizer gear such that rotation of the control gear causes rotation of the stabilizer gear about the central axis relative to the fan rotor and rotation of the spindle gears about the corresponding radially extending fan-blade pivot axes to vary the pitch of each of the plurality of fan blades.

12. The variable-pitch fan of claim 9, wherein the counterforce system further includes an actuator coupled to one of the pitch controller and the stabilizer unit and the actuator is configured to rotate selectively the one of the pitch controller and the stabilizer unit about the central axis.

13. The variable-pitch fan of claim 9, wherein the linkage includes a first link arm coupled to the stabilizer unit and a second link arm coupled pivotably to the first link arm and to the fixed point.

14. The variable-pitch fan of claim 13, wherein at least one of the first link arm and the second link arm is configured to lengthen and shorten selectively.

15. The variable-pitch fan of claim 13, wherein at least one of the first link arm and the second link arm includes a linear actuator.

16. The variable-pitch fan of claim 9, wherein the counterweight is radially spaced apart from the stabilizer unit relative to the central axis and the counterweight is integrally formed with the linkage.

17. A variable-pitch fan for use with a gas turbine engine, the variable-pitch fan comprising
a plurality of fan blades mounted for rotation about a central axis of the variable-pitch fan, the plurality of fan blades extend radially outward away from the central axis along corresponding radially extending fan-blade pivot axes, and each of the plurality of fan blades configured to rotate about the corresponding radially extending fan-blade pivot axis,
a control gear mounted to rotate about the central axis with the plurality of fan blades, the control gear coupled to the plurality of fan blades and configured to move selectively relative to the plurality of fan blades to cause the plurality of fan blades to rotate about the radially extending fan-blade pivot axes, and
a counterforce system mounted to rotate about the central axis with the plurality of fan blades, the counterforce system coupled to the control gear, and the counterforce system including a stabilizer gear, a linkage, and a counterweight, the stabilizer gear coupled to the control gear and configured to move selectively relative to the plurality of fan blades and relative to a fixed point that rotates with the plurality of fan blades, the linkage coupled pivotably to the stabilizer gear and coupled pivotably to the fixed point, and the counterweight coupled to the linkage for movement therewith.

18. The variable-pitch fan of claim 17, wherein the linkage includes a first link arm coupled to the stabilizer gear and a second link arm coupled pivotably to the first link arm and to the fixed point.

19. The variable-pitch fan of claim 18, wherein at least one of the first link arm and the second link arm is configured to lengthen and shorten selectively.

20. The variable-pitch fan of claim 17, wherein the counterforce system further includes an actuator coupled to one of the control gear and the stabilizer gear and the actuator is configured to rotate selectively the one of the control gear and the stabilizer gear about the central axis.

* * * * *